United States Patent
Engelhardt et al.

(10) Patent No.: US 7,641,387 B2
(45) Date of Patent: Jan. 5, 2010

(54) POWER LINE TEMPERATURE AND SAG MONITOR SYSTEM

(75) Inventors: John Engelhardt, Greenwich, CT (US); Larry Fish, White Plains, NY (US)

(73) Assignee: Underground Systems, Inc., Armonk, NY (US)

(*) Notice: Subject to any disclaimer, the term of this patent is extended or adjusted under 35 U.S.C. 154(b) by 0 days.

(21) Appl. No.: 12/335,607

(22) Filed: Dec. 16, 2008

(65) Prior Publication Data

US 2009/0138229 A1    May 28, 2009

Related U.S. Application Data

(63) Continuation of application No. PCT/US2007/068429, filed on May 8, 2007.

(51) Int. Cl.
| | |
|---|---|
| *G01K 11/00* | (2006.01) |
| *G01N 3/00* | (2006.01) |
| *G01L 5/04* | (2006.01) |
| *G01L 1/00* | (2006.01) |
| *H02G 7/05* | (2006.01) |

(52) U.S. Cl. .................. 374/142; 374/45; 374/110; 374/115; 374/152; 73/862.391

(58) Field of Classification Search .................. 374/45, 374/46, 110, 115, 142, 152, 166; 73/862.391
See application file for complete search history.

(56) References Cited

U.S. PATENT DOCUMENTS

| | | | | |
|---|---|---|---|---|
| 4,728,887 | A * | 3/1988 | Davis ........................ | 324/127 |
| 5,517,864 | A * | 5/1996 | Seppa .................. | 73/862.391 |
| 6,229,451 | B1 * | 5/2001 | Brown ........................ | 340/657 |
| 6,523,424 | B1 * | 2/2003 | Hayes et al. ........... | 73/862.391 |
| 2005/0222808 | A1 * | 10/2005 | Zima et al. .................. | 702/182 |
| 2006/0125469 | A1 * | 6/2006 | Hansen ..................... | 324/158.1 |
| 2006/0265175 | A1 * | 11/2006 | Shimohamadi ............. | 702/130 |
| 2007/0038396 | A1 * | 2/2007 | Zima et al. ..................... | 702/65 |
| 2007/0200556 | A1 * | 8/2007 | Engelhardt ............... | 324/158.1 |

* cited by examiner

*Primary Examiner*—Gail Verbitsky
*Assistant Examiner*—Mirellys Jagan
(74) *Attorney, Agent, or Firm*—Frommer Lawrence & Haug LLP; William S. Frommer

(57) ABSTRACT

The combination of a temperature sensor and an inclination sensor or the combination of a temperature sensor and a tension monitor properly positioned in conjunction with an energized electrical conductor produces outputs that are dependent on the conductor's average temperature in real time. A transmitter is used to communicate this information in real time to a central location such that up to optimal or maximum power transmission is feasible through the conductor while maintaining a safe clearance to the ground. This allows for close monitoring of thermal expansion resulting from increased load as well as varying environmental conditions.

8 Claims, 1 Drawing Sheet

POWER LINE TEMPERATURE AND SAG MONITOR SYSTEM

This is a continuation of International Application PCT/US2007/068429, filed May 8, 2007.

BACKGROUND OF THE INVENTION

1. Technical Field

The invention relates to an apparatus and method of monitoring the average temperature in energized electrical conductors such as power lines so as to assure safe clearance from the ground. More particularly, the invention relates to an apparatus and method for measuring the temperature and sag of energized electrical conductors such as power lines in real time as they change with varying electrical load on the line as well as varying environmental conditions causing thermal expansion where the temperature monitor assists in the determination of the maximum power transmission feasible through such conductor while maintaining safe clearance from the ground.

2. Background Information

With deregulation of utilities including electrical utilities, it is now more important than ever that utilities be efficient in the delivery of services since competition now exists. In addition, deregulation has opened up new markets for individual utilities and as a result all utilities are seeking to expand while defending their home region. As a result, there is an ever-increasing need for electric utilities to transfer more power through their existing power lines, that is to maximize transmission through existing resources.

One hurdle to increased power transmission is clearance between the power line and the ground or structure. Government regulatory codes can mandate safety considerations for overhead or suspended power lines that require utilities to provide adequate clearances between the ground and/or structures under the power line. This clearance may need to be maintained at all times including in all weather conditions and under all actual load conditions.

Thus, clearance can be is one of the considerations to electrical utilities because power lines sag under increasing power loads and as a result limitations are placed on the ampacity or maximum load a line is allowed to carry. The reason for this is that power lines sag as load is placed on the power line and that sag increases as the load increases. This sag-load correlation is the result of heat causing the temperature of the conductor to rise and further causing thermal expansion of the conductor corresponding to load levels. Heat is generated in the conductor by the resistance losses resulting as electrical current flows through it. This heat causes thermal expansion of the conductor. As load increases more heat is generated resulting in ever increasing thermal expansion of the power line causing the power line to sag closer to the ground. Because government regulations mandate the minimum clearance, utilities must assure that this minimum clearance is never violated.

In addition, numerous other factors also affect the suspended power line and the sag therein including ambient temperature (warmer temperatures increase sag), and wind speed and direction (wind usually cools the line and thus decreases sag). All of these factors, and primarily the thermal expansion, are considerations to electrical utilities as indicated above because steps must be taken to assure that adequate clearances as required by law are maintained. As a result, ampacity, or the maximum load is generally limited to less than maximum levels as a safety factor to assure that minimum clearance is maintained at all times and under all weather and load conditions. It is often typical that safety is a significant factor and thus maximum load is significantly affected.

Adequate clearance regulations are necessary because power lines, after being installed in relation to the ground or structures, may later sag so as to become too close to the ground or structures resulting in significant safety concerns. One such concern is that when power lines sag too close to the ground, electrical shock or contact with the lines becomes more feasible and thus safety is at issue. Another such concern is that electric flashover scenarios are possible as lines become too close to electrically grounding objects such as the ground or structures, and such electric flashover can result in extensive damage.

During installation and before a load is placed on the lines, the power lines can be installed such that sufficient clearance is achieved. This can readily be done by mere visual sight alignment or by simple measurement techniques measuring the distance from the lowest part of the line to the ground or nearest structure. It is even possible to very roughly account for factors such as ambient temperature, wind speed, wind direction and other environmental factors using conservative assumptions and historical knowledge. It is noteworthy though that such conservative assumptions result in significantly less than maximum line loading.

However, once an electrical load is placed on the power lines, various load factors cause the power lines to sag. One of these factors is thermal expansion of the power line under load as mentioned above, and specifically under a continuously varying load. The clearance between a suspended electrical conductor and the ground decreases as the conductor sags due to this thermal expansion under load. Thermal expansion can be correlated to load in the conductor such that increased load results in increased thermal expansion. Due to the desire to transmit as much power as possible through electrical conductors, it is important to monitor this thermal expansion and the resulting sag.

Full utilization of transmission lines requires analysis of sag and clearance with respect to these sag factors and the thermal expansion factor. In theory, this allows for the calculation of maximum load that still provides for minimum clearance as required by safety regulations. Current technology is such that several approximate methods provide for such approximation or calculation.

One method for determining power line sag involves measuring the temperature of the conductor at a particular spot on the power line. Mathematical modeling is then used to calculate the sag. This method is an approximation because the conductor temperature varies based upon location radially within the conductor, location on the line, wind, exposure to elements, etc. and thus the approximation may be inaccurate.

Safety factors are instituted to assure minimum clearances at all times thereby not optimizing the thermal expansion and sag allowed. Some of the problems of this method are due to its approximating qualities rather than accurate calculations. Other disadvantages and/or problems result from the inability to measure the temperature at all points, instead of sample points. As a result of these and other disadvantages and problems, additional safety factors may need to be added to assure minimum clearances, but as a result optimization suffers.

Alternatively, the environmental factors have been measured on the spot and then used to calculate the actual conductor temperature in conjunction with the above mentioned conductor temperature reading. This approach is time consuming, labor intensive, indirect and often subject to large errors.

Monitoring sag in a power line by only monitoring temperature can have disadvantages. These disadvantages may include conservative current ratings resulting from an assumed combination of worst case cooling conditions. Worst case cooling condition can include a combination of highest expected ambient temperature and lowest wind speed, both of which are may not occur under actual conditions. Monitoring of sag using temperature can also include adding a time function to the calculation that is to intermittently calculate rather than worst case scenario. The actual measurement of conductor sag or alternatively the ground clearance can also be measured manually. These measurements may be done with actual measuring, using acoustics, microwaves, and laser beams, although none of these methods may be practical. The equipment can be bulky, heavy and expensive. The equipment is typically installed on the ground under the conductor and thus must be left unattended where it is subject to vandalism, and it reduces the clearance at the center portion of the line where it is installed.

Other methods of measuring power line sag include measuring the power line tension at a suspension point. Because the line tension is affected by its inclination angle, by knowing the tension, the inclination angle can be determined and thus the sag. There are limitations and/or disadvantages associated with this tension measuring method. First, load cells used to measure the tension must be capable of measuring very small changes in a large static tension that is continuous on the line; and as a result, the accuracy of the sag determination is based upon the accuracy of the load cell and its capability of measuring small tension changes. Second, often load cells must be installed in-line which requires de-energizing and cutting of the line; and as a result, significant labor expense and line downtime is incurred. Finally, many of the current tension reading load cells must be installed on the grounded end of insulators holding the line at dead-end structures; and as a result, calculations cannot be performed on all spans.

SUMMARY OF THE INVENTION

The present invention provides a simplified, accurate and easy to use, time sensitive system of monitoring sag in power transmission lines.

In one aspect, the invention is a system consisting of temperature sensors, inclinometers and/or tension sensors that is used in conjunction with an energized electrical conductor to sense average temperature and sag of the suspended conductor in real time and at regular intervals based upon a signal output of the temperature sensor and inclinometer sensor suite, or temperature sensor and tension sensor suite. The results can then be used to determine the maximum allowable power transmission while still maintaining safe clearance between the energized electrical conductor and the ground or other obstruction.

The invention therefore relates to a method of monitoring the average temperature and sag in energized electrical conductors such as power lines so as to assure safe clearance from the ground. More particularly, the invention relates to a method for measuring the temperature of energized electrical conductors such as power lines in real time as it changes with varying electrical load on the line as well as varying environmental conditions causing thermal expansion where the temperature monitor assists in the determination of the maximum power transmission feasible through such conductor while maintaining safe clearance from the ground.

In an implementation, the invention includes a system consisting of temperature sensors, inclinometers and/or tension sensors that can be used in conjunction with an energized electrical conductor to sense the average temperature of the suspended conductor in real time and at regular intervals based upon a signal output of the temperature sensor and inclinometer sensor, or temperature sensor and tension sensor suites. The results may then be used to determine the maximum allowable power transmission while still maintaining safe clearance between the energized electrical conductor and the ground or other obstruction.

Some of the implementations of the invention can provide one or more of the following advantages:

Advantages of the invention include providing an improved methodology for monitoring the average temperature and sag of a conductor to determine the maximum ampacity for power transmission lines.

A further advantage is to provide such an improved temperature monitor that provides the average conductor temperature which is directly correlated with the sag and having accurate sag measurement so as to allow electric utilities assurances of minimum clearances while also providing maximum load in the lines.

A further advantage is to provide such an improved temperature monitor, that accounts for all factors affecting the conductor temperature such as ambient temperature, wind speed and direction, solar radiation and any other factors. It is well known that the average conductor temperature incorporating all point temperature measurements along the span is an accurate reflection of all these conditions.

A further advantage is to provide such an improved sag monitor that provides for the full utilization of power transmission lines.

A further advantage is to provide such an improved temperature and sag monitor that measures the average temperature and sag of energized electrical conductors in real time as it changes with the electrical load on the line.

A further advantage is to provide such an improved average temperature and sag monitor that measures the average temperature and sag of energized electrical conductors at regular intervals.

A further advantage is to provide such an improved average temperature and sag monitor that measures the sag of energized electrical conductors and transmits such information to a receiver for monitoring and/or load adjustment.

A further advantage is to provide such an improved average temperature and sag monitoring system to determine sag and thus assure minimum clearance.

A further advantage is to provide such an improved average temperature and sag monitor that will provide accurate inputs to calculate maximum line capacity in real time.

A further advantage is to provide such an improved average temperature and sag monitor that transmits inclination average temperature and sag/or clearance information to a remote site where power line load may be controlled.

A further advantage is to provide such an improved average temperature and sag monitor that is flexible, more accurate, easy to install, and cost effective.

A further advantage is to provide such an average temperature and sag monitor that incorporates one or more or all of the above advantages and advantages.

DETAILED DESCRIPTION

Figure 1:
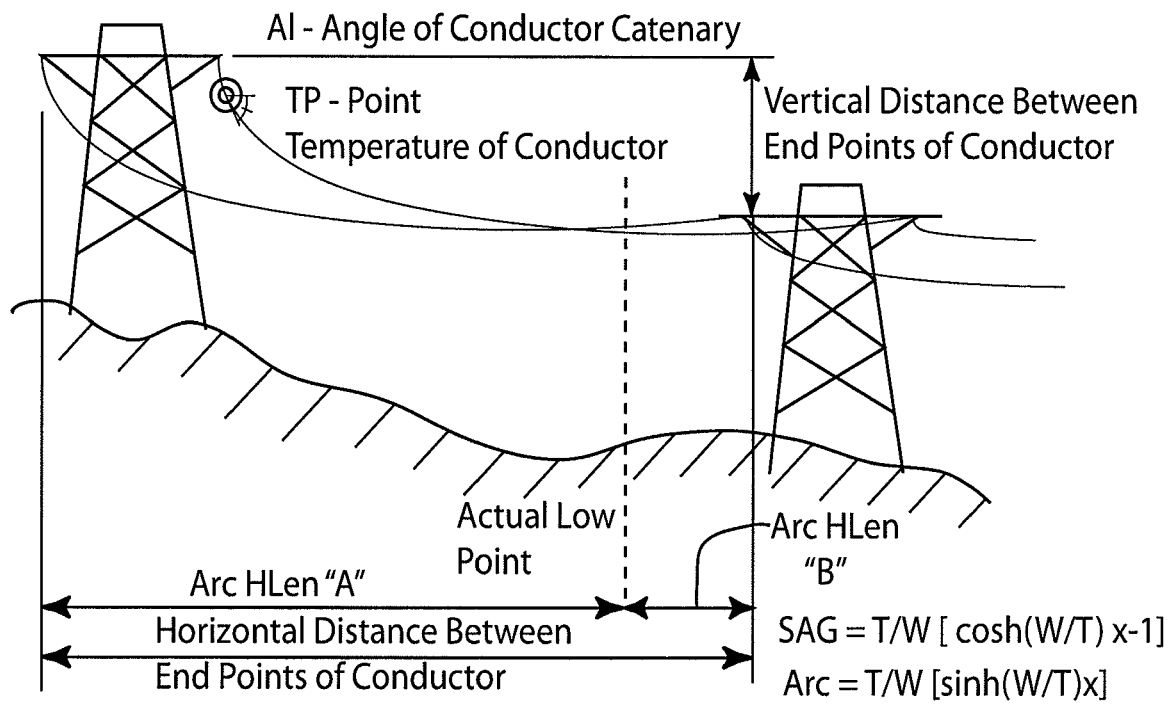
FIG. 1 is a side elevation view of one section of the power lines shown with a sag that provides for sufficient safety clearance between the line and the ground below it.

A new process for determining the average temperature and sag of a high voltage overhead electrical conductor is described herein. The technique uses conductor temperature measurements and either the angle of inclination or tension measurements from overhead line conductors, and incorporates that data into a digital, statistical estimator to derive the average conductor temperature and sag for the entire overhead span. The resultant temperature may be further used as in input to a dynamic rating algorithm.

The catenary equation describes the shape of an overhead electrical wire conductor suspended between two towers and the catenary equation can be used to compute the sag of the conductor relative to the end attachment points and the horizontal component of the tension in the conductor anywhere on the span.

The catenary equation is provided as Equation 1. A catenary is defined as the curve assumed by a hanging flexible wire conductor or chain when supported at its ends and acted upon by a uniform gravitational force.

$$y = \frac{T}{w}\cosh\left(\frac{w}{T}Y\right) + C \quad \text{Equation (1)}$$

where y is the elevation of the curve above the lowest point of the curve at any point x along the horizontal span of the curve starting at the lowest point, W is the specific weight per unit length (pounds/foot, for example) of the wire conductor or chain, and T is the horizontal component of the tension (pounds, for example) in the wire or chain.

When the physical characteristics of the wire conductor installation are known;
  weight per unit length of the wire conductor material
  horizontal and vertical distances between attachment points and if a sensor that provides the angle of inclination is attached at a known point along the wire conductor, then the angle of inclination measured by the inclination sensor can be used in conjunction with the catenary equation, and the sag, tension and arc lengths can be readily computed. In particular, the angle is related by its tangent to the vertical and horizontal tension components in the wire conductor at the (x, y) location along the wire conductor. Similarly, if a tension sensor is attached then the tension at the point of attachment can be used in conjunction with the catenary equation, instead of the angle of inclination, and the same parameters can be computed.

Furthermore, it is understood that said conductor length expands in response to increasing temperature, and as the conductor length increases, the length of the catenary arc increases, the sag increases, and the tension in the conductor decreases.

The temperature of the conductor can be measured at a point along the conductor by means of a temperature sensor. It is also understood that the temperature at a particular point on the conductor is related to the average temperature of the conductor and that the average temperature of the conductor determines the total amount of thermal expansion of the conductor; hence the arc length of the catenary is determined by the average temperature of the conductor.

The average temperature of the wire conductor can determined from a mathematical relationship that describes the related behaviors of point temperature measurements "TP" along the power line and angle of inclination measurements "AI", or with the tension in the wire conductor. For purposes of this discussion, "AI" can designate either the angle of inclination or tension. In either case a relationship can be described by a mathematical formula as embodied in a computer program numerical technique that computes the average temperature of an overhead electrical conductor knowing the weight per unit length of the conductor, horizontal and vertical distances between attachment points, the angle of inclination at a point along the conductor and/or the tension as measured at the end attachment point or on the conductor, and a point temperature along the conductor.

The average temperature of the conductor can be related to the angle of inclination or conductor tension as described above by means of a statistical equation, equation 2:

$$TP = S*AI + TPE \quad \text{Equation (2)}$$

where S represents the sensitivity and TPE represents the temperature measurement error. The TPE term should not be confused with the Average Temperature of the conductor as represented by "TA". The latter refers to a set of values representing temperature readings that would have been obtained had the point sensor reading been the same as the average of all the point sensor temperature readings that could be taken along the conductor arc length, whereas the TPE term is a single value representing the difference between the point temperature term "TP" and the average temperature "TA" term. TA can be computed according to equation 3:

$$TA = TP - S*(AI - AA) \quad \text{Equation (3)}$$

where AA is the average angle or average tension, at a measurement point for a specific average conductor temperature.

When the measured angle or measured tension "AI" equals the average angle or tension for the temperature "AA", the point temperature is equal to the average temperature. A linear regression of TP on AI yields equations 4 and 5:

$$S = \frac{COV(TP, AI)}{VAR(AI)} \quad \text{Equation (4)}$$

$$TPE = ave(TP) - S*ave(AI) \quad \text{Equation (5)}$$

Because the method assumes AI to be exact, the degree of confidence to be placed in these results depends in the accuracy of the measured data.

While the data is being acquired, the running averages are kept of all values of interest according to equation 6:

$$ave(X)_N = (1/N)*(X_N + (N-1)*ave(X)_{N-1}) \quad \text{Equation (6)}$$

The terms of interest are the TA and AI data, their squares and their product. In general, the variance and covariance can then be calculated in real time according to equations 7 and 8:

$$VAR(X) = ave(X^2) - ave(X)^2 \quad \text{Equation (7)}$$

$$COV(X,Y) = ave(X*Y) - ave(X)*ave(Y) \quad \text{Equation (8)}$$

The adequacy of the data can be determined by the number of data points, N, using the correlation factor defined according to equation 9:

$$K = \frac{COV(TP, AI)^2}{VAR(TP)*VAR(AI)} \quad \text{Equation (9)}$$

and by the variance of TP about the regression line:

$$S^2 = (N/(N-2))*(1-K)*VAR(TP) \quad \text{Equation (10)}$$

The average wire conductor temperature TA at any time is computed according to the covariance of the point temperature and the angle of inclination or tension for the $N^{th}$ readings which are furthermore the real time values and as described in the discussion above according to equation 11:

$$TA_N = TP_N - S_N * (AI_N - AA_{N-1}) \quad \text{Equation (11)}$$

where, $AI_N$ is the angle of inclination or tension for the "$N^{th}$" measurement, $TP_N$ the point temperature for the $N^{th}$ measurement, and $AA_{N-1}$ is the average inclination or tension computed for the previous iteration. $S_N$ is the regression coefficient determined using the real time numerical technique outlined above.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved temperature and sag monitor is constructed and used, the characteristics of the construction, and the advantageous, new and useful results obtained; the new and useful structures, devices, elements, arrangements, parts and combinations, are set forth in the statement of the invention.

What is claimed is:

1. A temperature and sag monitor system for use on a span of a power conductor, the span being of a section of the power conductor suspended between a pair of transmission towers, the monitor system for monitoring the average temperature and the sag of the span during power transmission, the temperature and sag monitor system comprising:
    a temperature sensor and inclinometer positionable on the span, the temperature sensor outputting signals indicating a temperature measurement of the span, and the inclinometer outputting signals indicating an angle of inclination of the span;
    transmitters electrically connected to the temperature sensor and the inclinometer for reading the output of the temperature sensor and the inclinometer, and transmitting signals indicative of the sensor outputs; and
    a processor including a receiver for receiving signals from the transmitters indicative of the output of the temperature sensor and the inclinometer, and calculating the average temperature and/or sag of the span based upon computing a real time covariance of the received signals.

2. The temperature and sag monitor system of claim 1, wherein the system further comprises:
    a housing adapted to be mounted onto the span, wherein the temperature sensor is affixed within the housing; and the inclinometer is affixed within the housing.

3. The temperature and sag monitor system of claim 1, wherein the processor calculates statistical correlations from the signals received.

4. The temperature and sag monitor system of claim 3, wherein the angle of inclination is used to calculate the average temperature based upon the statistical correlations.

5. temperature and sag monitor system for use on a span of a power conductor, the span being a section of the power conductor suspended between a pair of transmission towers, the monitor system for monitoring the average temperature and the sag of the span during power transmission, the temperature and sag monitor system comprising:
    a temperature sensor and a tension sensor positionable on the span, the temperature sensor outputting signals indicating a temperature measurement of the span, and the tension sensor outputting signals indicating a tension of the of the span;
    transmitters electrically connected to the temperature sensor and the tension sensor for reading the output of the temperature sensor and the tension sensor, and transmitting signals indicative of the sensor outputs; and
    a processor including a receiver for receiving signals from the transmitters indicative of the outputs of the temperature sensor and the tension sensor, and calculating the average temperature and/or sag of the span based upon computing a real time covariance of the received signals.

6. The temperature and sag monitor system of claim 5, wherein the system further comprises:
    a housing adapted to be mounted onto the span, wherein the temperature sensor is affixed within the housing; and the tension sensor is affixed either within the housing or external to the housing; the external tension sensor being affixed at a supporting end of the span.

7. The temperature and sag monitor system of claim 5, wherein the processor calculates statistical correlations from the signals received.

8. The temperature and sag monitor system of claim 7, wherein the tension of the span is used to calculate the average temperature based upon the statistical correlations.

* * * * *